Patented July 24, 1928.

1,678,346

UNITED STATES PATENT OFFICE.

RICHARD V. MATTISON, OF AMBLER, PENNSYLVANIA, ASSIGNOR TO KEASBEY & MATTISON COMPANY, A CORPORATION OF PENNSYLVANIA.

MILLBOARD PRODUCT AND PROCESS.

No Drawing. Original application filed June 25, 1921, Serial No 480,356. Divided and this application filed February 12, 1924, Serial No. 692,431. Renewed June 11, 1928.

This invention relates to artificial products of the general character of millboard, wall board, roofings, and the like, and its object is to produce a composition; and process of making the same, which shall be durable, fireproof, water and weather resisting, easily handled and worked, and generally adapted to meet the requirements of such material.

In carrying out my invention I mix hydraulic cement, fibrous material and one or more earthy carbonates or hydrates or a mixture of the two, and in the presence of water, work this mixture upon a millboard machine to form sheets or plates, and then before the cement sets subject the sheets or plates to high pressure. The fibrous material is preferably cellulose or asbestos, and the earthy carbonate is preferably calcium carbonate, magnesium carbonate, or a mixture of approximately 80% to 90% calcium carbonate and 20% to 10% magnesium carbonate, specially prepared by being made into a finely divided, light bulky mixture. An excellent example of the condition in which the carbonates should be is the residue of mixed calcium carbonate and magnesium carbonate resulting from the commercial manufacture of magnesium carbonate from dolomite in which calcium carbonate mixed with a small proportion of magnesium carbonate is precipitated from a solution of calcium and magnesium hydrates by pumping carbon dioxide therethrough. The precipitate is light, bulky, smooth, finely divided, and mixes intimately with the cement and fibrous material. A good example of proportions to be used is about 50%, by weight, of hydraulic cement, about 16⅔% of asbestos fibre, and about 33⅓% of calcium carbonate and magnesium carbonate, the latter being from about one-tenth to one-fifth in proportion to the calcium carbonate, though for the manufacture of a product of lighter weight a greater proportion of magnesium carbonate may be employed. These materials should be intimately mixed in a beating engine with a relatively large quantity of water, or at least sufficient whereby the cement will assume a sticky, gelatinous, or colloidal condition. The mixture is flowed upon the moving band of a millboard machine, or transferred thereto from the gauze cylinder of a cylinder machine, and from the moving band is preferably wound up in layers on a cylinder to form a sheet or plate of the desired thickness. The plates, sheets or slabs may, however, be formed in any convenient manner. The degree to which the cement is colloided will depend upon the amount of water used, its distribution and temperature and the extent to which it is allowed to gelatinize or colloid the cement. The more the cement is colloided the more homogeneous will be the resultant product.

After the sheets, plates or slabs are formed, and before the cement sets, they should be subjected to high pressure, preferably several tons per square inch in a hydraulic press.

In some cases instead of using carbonates, I may use hydrates, or mixtures of carbonates and hydrates.

The composition prepared as above described is suitable for a variety of uses. It is particularly adapted for use as mill-board or wall-board on account of being non-heat and non-sound conducting and also fireproof. The porous condition of the earthy carbonates, containing many occluded air spaces or cells aids materially in attaining these characteristics. Another important characteristic of the compositions, particularly such as contain the carbonates, is that they will readily receive and hold coloring matter without deteriorating. The product furthermore is self-sustaining, strong and durable.

This application is a division of my copending application Serial Number 480,356, filed June 25, 1921.

I claim:

1. A composition comprising colloided hydraulic cement, fibrous material, calcium hydrate and precipitated calcium carbonate, the mixture being subjected to pressure before the cement sets.

2. A composition comprising colloided hydraulic cement, fibrous material, calcium hydrate and precipitated magnesium carbonate, the mixture being subjected to pressure before the cement sets.

3. A composition comprising colloided hydraulic cement, asbestos fibre, calcium hydrate and precipitated calcium carbonate, the mixture being subjected to pressure before the cement sets.

4. A composition comprising colloided hydraulic cement, asbestos fibre, calcium hydrate and precipitated magnesium carbonate, the mixture being subjected to pressure before the cement sets.

5. A process of making sheet or plate material which consists in first intimately mixing hydraulic cement, fibrous material and finely divided calcium hydrate and precipitated calcium carbonate in the presence of a large quantity of water, working the mixture into sheet form before the cement sets and subjecting the sheets to pressure and allowing the cement to set.

6. A composition comprising hydraulic cement, fibrous material and a mixture of calcium hydrate and precipitated calcium carbonate which has been finely divided and rendered smooth, light and containing occluded spaces.

7. A composition composed of less than 60 per cent of colloided hydraulic cement and the remainder of the mixture comprising fibrous material and finely divided calcium carbonate and calcium hydrate, the substances having been mixed with water and subjected to pressure before the cement is set.

8. A composition composed of less than 60 per cent of colloided hydraulic cement and the remainder of the mixture comprising fibrous matrial and finely divided magnesium carbonate and calcium hydrate, the substances having been mixed with water and subjected to pressure before the cement is set.

9. A process of making sheet or plate material which consists in first intimately mixing hydraulc cement, fibrous materal and finely divided calcium hydrate and precipitated magnesium carbonate in the presence of a large quantity of water, working the mixture into sheet form before the cement sets and subjecting the sheets to pressure and allowing the cement to set.

RICHARD V. MATTISON.